United States Patent [19]

Labaig et al.

[11] Patent Number: 4,942,070
[45] Date of Patent: Jul. 17, 1990

[54] EXTRUDED CONDUITS AND METHOD OF MAKING THE SAME

[75] Inventors: Jean-Jacques Labaig; Michel Fenie, both of Bernay; Michel Glotin, Serquigny, all of France

[73] Assignee: Atochem, Paris la Defense, France

[21] Appl. No.: 279,976

[22] Filed: Dec. 5, 1988

Related U.S. Application Data

[62] Division of Ser. No. 34,343, Apr. 3, 1987, Pat. No. 4,812,274.

[30] Foreign Application Priority Data

Apr. 4, 1988 [FR] France ............................. 86 04880

[51] Int. Cl.$^5$ .................................................. F16L 9/12
[52] U.S. Cl. .................................. 428/36.9; 138/177; 138/DIG. 7; 428/910
[58] Field of Search ............... 428/36.9, 910; 138/177, 138/DIG. 7

[56] References Cited

U.S. PATENT DOCUMENTS

| | | | |
|---|---|---|---|
| 3,103,409 | 9/1963 | Bohres et al. | 264/209.7 |
| 3,382,220 | 5/1968 | Bowman, Jr. | 264/209.7 |
| 3,383,375 | 5/1968 | van der Vegt et al. | 264/235 |
| 3,553,303 | 1/1971 | Zavasnik | 264/150 |
| 3,655,848 | 4/1972 | Young et al. | 264/98 |
| 3,965,226 | 6/1976 | Werwitzke et al. | 264/93 |
| 4,115,495 | 9/1978 | Hartitz | 264/90 |
| 4,159,889 | 7/1979 | Yagi et al. | 264/565 |
| 4,238,538 | 12/1980 | Manwiller | 428/36.9 |
| 4,305,899 | 12/1981 | van Dongeren | 264/565 |

Primary Examiner—James Seidleck
Attorney, Agent, or Firm—Sigalos, Levine & Montgomery

[57] ABSTRACT

An extruded thermoplastic polymer conduit having a conduit wall of substantially uniform crystalline morphology through the entire thickness thereof free of any oriented surface zone and the process of making such conduits.

2 Claims, 1 Drawing Sheet

EXTRUDED CONDUITS AND METHOD OF MAKING THE SAME

BACKGROUND OF THE INVENTION

This application is a division of application Ser. No. 034,343 filed Apr. 3, 1987, now U.S. Pat. No. 4,812,274.

The present invention relates to conduits (i.e., pipes, tubes, and the like) made of extruded semi-crystalline plastic material such as polyamides, polyolefins such as polyethylene of high and low density, polypropylene, and thermoplastic polyesters which are well known and have numerous applications.

One use is as rigid or flexible compressed air distribution ducts; the latter constituting, for instance, a portion of the brake system of road vehicles such as trucks, in which the flexibility and the possibility of shaping of semi-crystalline plastic materials are especially appreciated. A preferred family of these plastic materials is that of the polyamides and among the latter, polyamide 11.

Within the scope of optimization of the manufacturing conditions of these pipes by extrusion and particularly in order to improve the mechanical properties of the pipes, one has found a molecular orientation which is produced at the surface of the pipes as a result of the friction of the yet plastic pipe against the surface of the means used to shape the pipe to the dimensions desired.

On the macroscopic scale, damage to the "skin" or surface face of the conduits, such as abrasions, scratches, and the like, can be the cause of an abnormal percentage of breaks during impact resistance tests in the cold state carried out on samples of conduits.

On the microscopic scale, by birefringence measurements carried out on small plane sections adjacent to the axis of the pipes, an orientation parallel to that axis was found of a thickness between 20 and 200 microns, and more precisely between 50 and 100, microns. One has been able to observe, furthermore, that the orientation maximum corresponding to the birefringence maximum was not located at the surface of the conduit, but at a depth of about twenty microns from the surface, measured in the direction of the axis of the conduit. What we will call the "crystalline morphology" of the conduit is characterized by the thickness of the oriented skin and its orientation level in absolute value.

By pursuing a theory put forth by Dragaun, Hubeny and Muschik in the Journal of Polymer Science, vol. 15, pages 1779 to 1789 (1977), it was thought that the orientation maximum probably corresponds to an inflection point at the rate profile established at a variable distance from the wall of the conduit or to a maximum of shearing velocity at these same points of measurement, when the pipe re-enters the shaping means used to form the conduit to the precise dimensions desired.

SUMMARY OF THE INVENTION

The present invention provides novel thermoplastic polymer conduits prepared by extrusion which do not have an oriented surface zone and a process for preparing such conduits.

Briefly, the present invention comprises an extruded thermoplastic polymer conduit having a conduit wall of substantially uniform crystalline morphology throughout the entire thickness thereof and the process of making such conduits comprising extruding and shaping a semi-crystalline thermoplastic polymer into the form of a conduit with an oriented surface zone extending into a portion of the wall thereof, heating said conduit for a time and at a temperature sufficient to melt said oriented surface zone, and cooling said conduit to recrystallize said oriented surface zone to substantially the same crystalline morphology as the remainder of said conduit wall.

DETAILED DESCRIPTION

The thermoplastic polymers used in the present invention are advantageously selected from the group consisting of polyamides, polyolefins and thermoplastic polyesters.

Figure 1:
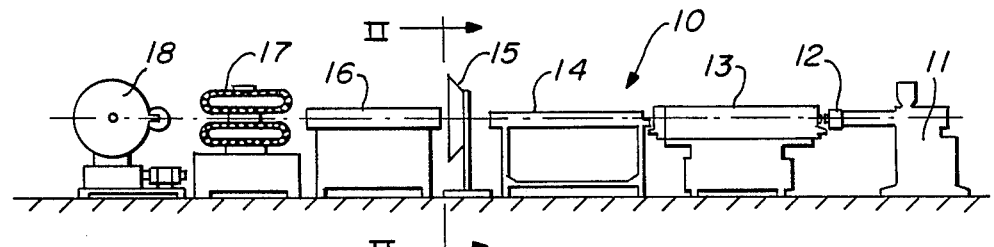
FIG. 1 is an elevational view of an extrusion line for carrying out the process of the instant invention.

The invention will be further described in connection with the drawings in which FIG. 1 shows an extrusion line 10 consisting of an extruder 11 equipped with an extrusion head 12, both conventional. A shaper tank 13 receives the extruded conduit. Tank 13 can be of the conventional type which provides calibrating in vacuo, which permits obtaining an excellent precision of dimensions of the conduit, but involves the drawback of orienting the plastic material at the surface and possibly of scratching it because of the considerable friction between the conduit and the wall of the caliber gauge in tank 13.

Combining the dimensional precision obtained by shaping in, for instance, tank 13 in vacuo with a remelting of the external layer of the pipe oriented by friction at the surface of the caliber gauge permits maintaining the precision of the dimensions of the non-remelted internal layers of the pipe and preserves their cohesion during the thermal treatment according to the invention.

One will easily understand this important point if one considers that for the usual dimensions for a polyamide 11 conduit of an external diameter of 12 mm and an internal diameter of 9 mm, the remelting only concerns about 60 microns for a thickness of 1.5 mm or 4% of the thickness.

Thus, the thermal treatment is controlled with a great degree of precision.

A conventional cooling tank 14 permits a temperature adjustment prior to the thermal treatment station.

Figure 2:
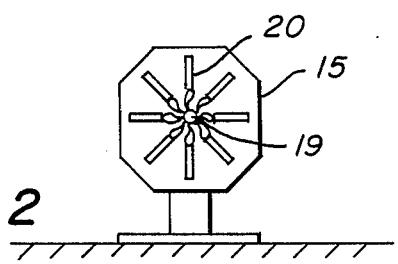
FIG. 2 is a front view taken along line II—II of FIG. 1.

The thermal treating station shown in FIGS. 1 and 2 comprises a direct flamer 15 having six 5" BUNSEN burners 20 arranged symmetrically about the extruded conduit 19 (FIG. 2).

The centering of the six burners 20 can be regulated very precisely by means of a conventional mounting on slides (not shown) equipped with micrometer calibrated adjustment screws. The pressure of gas allowed to enter burners 20 can likewise be regulated by pressure-reduction valves so that in the case of extrusion of the polyamide 11 conduit, a temperature of the order of 220° C. can be attained at the surface of the extruded conduit.

After the direct flamer 15 hardening in a water cooling vat 16 takes place. Vat 16 has a length of 0.50 m and water flows through it at 23° C.

The conduit is pulled through the system by means of a conventional pulling device 17 and transferred to a conventional automatic cutter 18 which cuts the conduit to the length desired.

Figure 3:
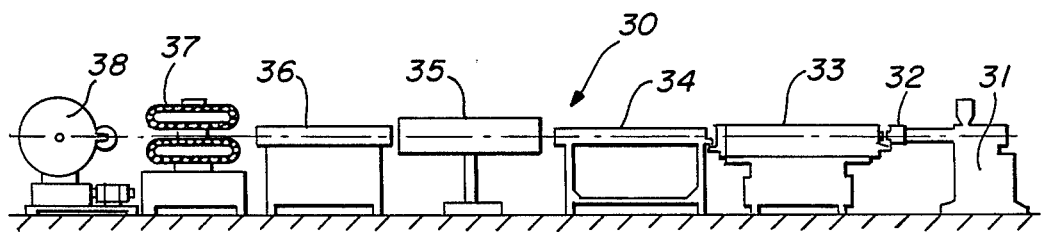
FIG. 3 is an elevational view of an alternate extrusion line for carrying out the process of the instant invention.

In the variation shown on FIG. 3 the extrusion line 30 has elements 31, 32, 33, 34, 36, 37, and 38 which correspond to elements 11, 12, 13, 14, 16, 17, and 18 of FIG. 1. However, a conventional quartz furnace 35 is used in place of the direct flaming device 15.

Tests of sweeping with air currents or nitrogen currents were carried out in the quartz furnace 35. It was thus shown that the variations of the mechanical properties of the pipes were not due to a possible effect of oxidation but to the effect of the thermal treatment.

Air cooling by a conventional blast ring by a fan (not shown) was likewise tested successfully as illustrated in the examples below.

The thermal treatment is considered to be "controlled" when the melting of the oriented surface zone is complete and when after water hardening natural recrystallization has replaced said oriented surface zone.

This phenomenon is established by microphotography in polarized light. The oriented surface zone is characterized by lines (scratches, streaks) parallel to the axis of the pipe, with the crystallized deep zone distinguishing itself by oblique lines.

After thermal treatment and recrystallization the entire thickness of the pipe is characterized by oblique lines.

The invention will be further described in connection with the following examples which are set forth for purposes of illustration only.

EXAMPLE 1

Pipes of dimensions 9×12 mm are made of plastified polyamide 11 of black commercial reference BESNO P40 TL using the extrusion line of FIG. 3 with water vat 36 and alternately an air cooling ring as described above. The resultant pipes are tested together with control pipe extruded in the same manner, but not subjected to thermal treatment in accordance with the present invention and the results are set forth in Table I.

TABLE I

| | Control | Thermal treatment Quartz furnace and water hardening | Thermal treatment Quartz furnace and air cooling |
|---|---|---|---|
| Breaking stress (bars) | 320 | 470 | 470 |
| Breaking elongation (%) | 253 | 442 | 443 |
| Impact breakage in the cold state (%) | | | |
| −25° C. | 0 | 0 | 0 |
| −40° C. | 6 | 1.2 | 5 |
| −60° C. | 57 | 3 | 22 |
| Birefringence | 23 | 4 | 4 |

TABLE I-continued

| | Control | Thermal treatment Quartz furnace and water hardening | Thermal treatment Quartz furnace and air cooling |
|---|---|---|---|
| $\Delta n \times 10^3$ | | | |

EXAMPLE 2

The procedure of Example 1 is followed except that the polyamide used is plastified polyamide 12 (commercial reference AESNO P40 TL) to make the 9×12 mm pipes.

The resultant pipes are tested and the results set forth in Table II below.

TABLE II

| | Control | Thermal treatment Quartz furnace and water hardening | Thermal treatment Quartz furnace and air cooling |
|---|---|---|---|
| Breaking stress (bars) | 295 | 440 | 390 |
| Breaking elongation (%) | 268 | 480 | 425 |
| Impact breakage in the cold state (%) | | | |
| −25° C. | 5 | 0 | 4.5 |
| −30° C. | 40 | 12.5 | 30 |
| Birefringence $\Delta n \times 10^3$ | 25 | 3 | 3 |

A very significant improvement of the mechanical properties of the pipes under traction (tensile strength; i.e., simultaneous increase of the values of breaking stress and of breaking elongation) is noted.

The falling mass impact tests are carried out according to a test derived from NFR Standard 12 632 of ISO/DIS Standard 7628/2.

The pipes are introduced into an apparatus of the guillotine type in which from a height of 0.70 m there falls a weight of 8 kg of cylindrical form and of a curvature opposite that of the pipe and orthogonal to it. There are no impediments limiting the course of the weight during the crushing of the pipe.

Figure 4:
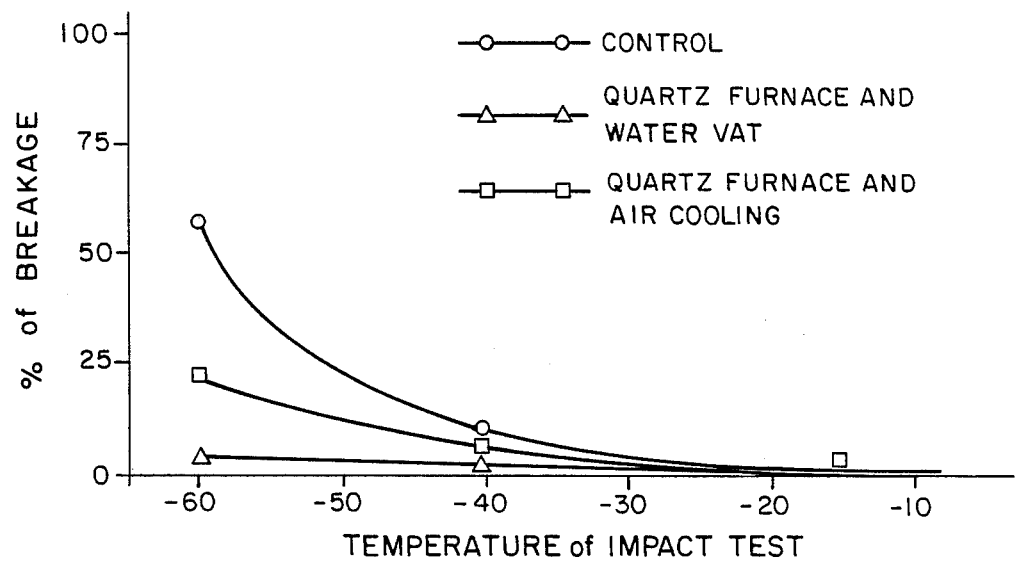
FIG. 4 is a graph showing the resistance to breakage of conduits of the present invention as compared to control conduits.

The variations of the breaking percentage of the samples of Example 1 are shown by FIG. 4.

The gain contributed by the controlled thermal treatment comprising the two phases of melting and of water quenching is clearly demonstrated. The gain contributed by a recrystallization after air cooling is smaller.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. An extruded thermoplastic polymer conduit having a conduit wall with a previously oriented surface zone that has been recrystallized by melting and cooling said zone to a crystalline morphology which is identical to the crystalline morphology of the remainder of said conduit wall.

2. The conduit of claim 1 wherein said thermoplastic polymer is selected from polyamides, polyolefins, and thermoplastic polyesters.

* * * * *